United States Patent
Desai et al.

(10) Patent No.: US 10,296,428 B2
(45) Date of Patent: May 21, 2019

(54) CONTINUOUS REPLICATION IN A DISTRIBUTED COMPUTER SYSTEM ENVIRONMENT

(75) Inventors: Samir Desai, Maharashtra (IN); Niranjan Pendharkar, Pune (IN)

(73) Assignee: Veritas Technologies LLC, Mountain View, CA (US)

( * ) Notice: Subject to any disclaimer, the term of this patent is extended or adjusted under 35 U.S.C. 154(b) by 227 days.

(21) Appl. No.: 12/781,292

(22) Filed: May 17, 2010

(65) Prior Publication Data

US 2011/0282834 A1 Nov. 17, 2011

(51) Int. Cl.
*G06F 17/30* (2006.01)
*G06F 11/20* (2006.01)

(52) U.S. Cl.
CPC ...... *G06F 11/2094* (2013.01); *G06F 11/2097* (2013.01); *G06F 11/2064* (2013.01); *G06F 11/2071* (2013.01); *G06F 2201/82* (2013.01)

(58) Field of Classification Search
CPC ............. G06F 11/2094; G06F 11/2097; G06F 2201/82; G06F 11/2064; G06F 11/2071
See application file for complete search history.

(56) References Cited

U.S. PATENT DOCUMENTS

| 6,189,048 | B1* | 2/2001 | Lim ...................... G06F 9/548 719/330 |
| 7,340,490 | B2* | 3/2008 | Teloh et al. |
| 7,533,330 | B2* | 5/2009 | Anderson et al. ............ 714/799 |
| 2002/0099728 | A1* | 7/2002 | Lees et al. .................... 707/203 |
| 2004/0158588 | A1* | 8/2004 | Pruet, III .......... G06F 17/30578 |
| 2007/0136389 | A1* | 6/2007 | Bergant ............. G06F 11/1435 |
| 2009/0150431 | A1* | 6/2009 | Schmidt et al. .......... 707/103 R |
| 2010/0083222 | A1* | 4/2010 | Maximilien et al. ......... 717/110 |
| 2010/0100664 | A1* | 4/2010 | Shimozono ........... G06F 3/0611 711/103 |

* cited by examiner

*Primary Examiner* — Usmaan Saeed
*Assistant Examiner* — Paul Kim
(74) *Attorney, Agent, or Firm* — Patent Law Works LLP

(57) ABSTRACT

A method for implementing continuous data replication in a distributed computer system. The method includes receiving a forwarded data object write I/O from a data server. The method further includes examining attribute information of the data object to determine a consistency group for the data object. A replication policy is examined in view of the consistency group of the data object to determine a destination redundancy server. The data object write I/O is forwarded to the destination redundancy server for storage. An acknowledgment is then sent to the data server upon storage of the data object in the destination redundancy server.

13 Claims, 8 Drawing Sheets

CONTINUOUS REPLICATION IN A DISTRIBUTED COMPUTER SYSTEM ENVIRONMENT

FIELD OF THE INVENTION

The present invention is generally related to digital computer, more particularly, to a system and method for periodically replicating data in volumes.

BACKGROUND OF THE INVENTION

Information drives business. Companies today rely to an unprecedented extent on online, frequently accessed, constantly changing data to run their businesses. Unplanned events that inhibit the availability of this data can seriously damage business operations. Additionally, any permanent data loss, from natural disaster or any other source, will likely have serious negative consequences for the continued viability of a business. Therefore, when disaster strikes, companies must be prepared to eliminate or minimize data loss, and recover quickly with useable data.

Replication technology is primarily used for disaster recovery and data distribution. Continuous replication technology often includes RAID based replication schemes (e.g., disk mirroring, parity, or the like). Continuous replication maintains copies of the data as the data is being written to by applications. Periodic replication is another technique utilized to minimize data loss and improve the availability of data in which a point-in-time copy of data is replicated and stored at one or more remote sites or nodes. In the event of a site migration, failure of one or more physical disks storing data, or failure of a node or host data processing system associated with such a disk, the remote replicated data copy may be utilized. For both continuous replication and periodic replication, in addition to disaster recovery, the replicated data enables a number of other uses, such as, for example, data mining, reporting, testing, and the like. In this manner, the replicated data copy ensures data integrity and availability. Additionally, replication technology is frequently coupled with other high-availability techniques, such as clustering, to provide an extremely robust data storage solution.

Data storage required for applications such as file systems and databases are typically allocated from one or more storage devices that are maintained as a "volume". The "volume" may serve as a logical interface used by an operating system to access data stored on one or more storage media using a single instance of a file system. Thus, a volume may act as an abstraction that essentially "hides" storage allocation and (optionally) data protection/redundancy from the application. An application can store its data on multiple volumes. The content of a volume is accessed using fixed sized data units called blocks.

In very large distributed computer systems the data is distributed in number of data servers. The clients directly write data to the data servers with minimal points of interaction with any metadata server. The data servers typically have multiple LUNs (logical unit numbers) which have their own reserved storage space. Each LUN can have a large number of partitions, with the objects contained in these partitions. The files of distributed computer system file system are composed of the objects from any of the data server LUN partitions. The objects from various data servers are combined to form RAID groups. Since there can be hundreds of clients, it is not possible to tap the client end to provide continuous replication of data.

SUMMARY OF THE INVENTION

Embodiments of the present invention provide a solution that enables efficient and highly scalable continuous replication of data for a distributed computer system. Embodiments of the present invention are optimized to function with highly scalable distributed computer systems having hundreds of nodes, or more (e.g., cloud computing system, etc.).

In one embodiment, the present invention comprises a computer implemented method for implementing continuous data replication in a distributed computer system. The method includes receiving a forwarded data object write I/O from a data server. The method further includes examining attribute information of the data object to determine a consistency group for the data object. A replication policy is examined in view of the consistency group of the data object to determine a destination redundancy server. The data object write I/O is forwarded to the destination redundancy server for storage. An acknowledgment is then sent to the data server upon storage of the data object in the destination redundancy server.

In one embodiment, the replication policy is a RAID (redundant array of inexpensive discs) based replication policy.

In one embodiment, the consistency group spans a plurality of files.

In one embodiment, the consistency group spans a plurality of file systems.

In one embodiment, the consistency group spans a plurality of file systems across a plurality of data servers.

In one embodiment, data objects specified by a consistency group are asynchronously replicated in accordance with the replication policy to implement continuous data replication for the consistency group.

In one embodiment, the present invention is implemented as a Computer readable storage medium having stored thereon, computer executable instructions that, if executed by a computer system cause the computer system to perform a method for implementing continuous data replication in a distributed computer system. The method includes receiving a forwarded data object write I/O from a data server, and examining attribute information of the data object to determine a consistency group for the data object. The method further includes examining a replication policy in view of the consistency group of the data object to determine a destination redundancy server, forwarding the data object write I/O to the destination redundancy server for storage. The method further includes sending an acknowledgment to the data server upon storage of the data object in the destination redundancy server.

In one embodiment, the present invention is implemented as a continuous replication system. The continuous replication system includes a computer system having a processor coupled to a computer readable storage media and executing computer readable code which causes the computer system to implement a replication manager module. The replication manager module receives a forwarded data object write I/O from a data server, and examines attribute information of the data object to determine a consistency group for the data object. The replication manager module examines a replication policy in view of the consistency group of the data object to determine a destination redundancy server, and forwards the data object write I/O to the destination redundancy server for storage. The replication manager module then sends an acknowledgment to the data server upon storage of the data object in the destination redundancy server.

In one embodiment, a plurality of replication servers are used to instantiate the functionality of the replication manager module.

In one embodiment, the replication manager module implements continuous data replication for a cloud based computer system.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
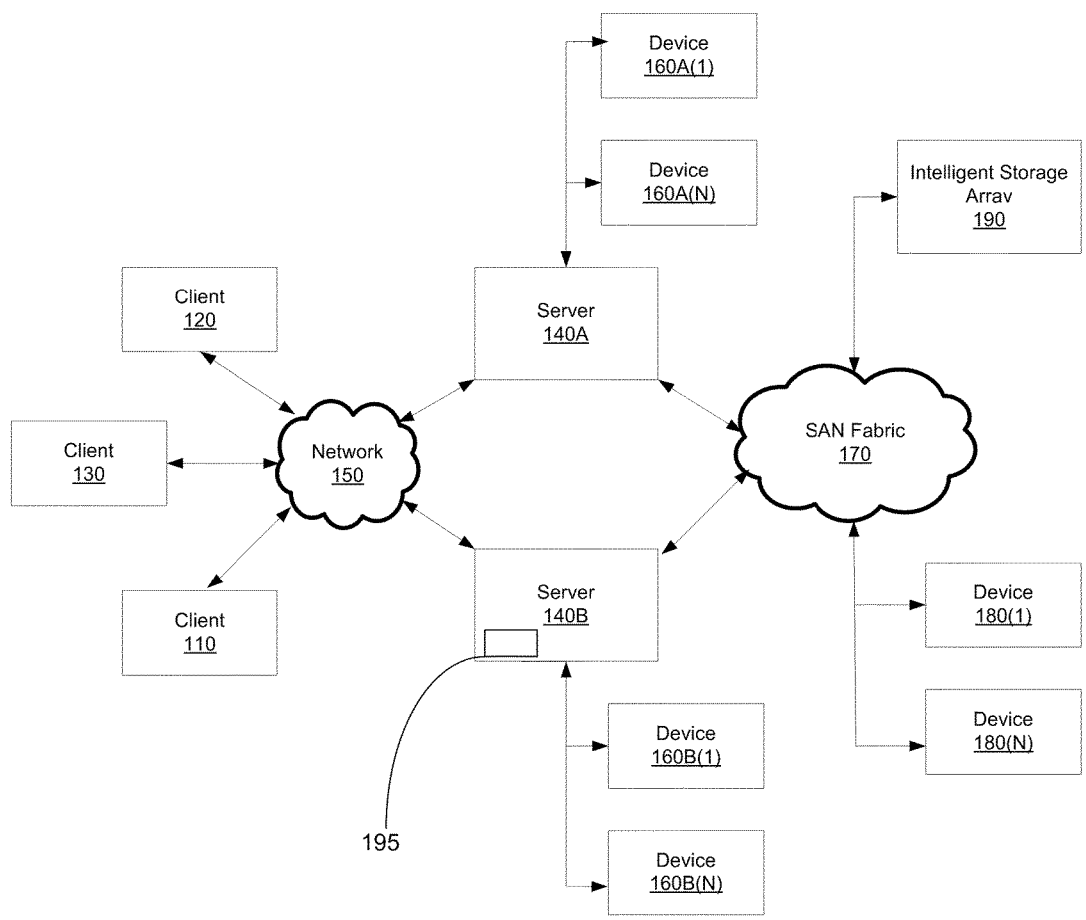
FIG. 1 is a block diagram depicting a network architecture in which client systems as well as storage servers are coupled to a network in accordance with one embodiment of the present invention.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "writing" or "storing" or "replicating" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Embodiments of the present invention provide a solution that enables efficient and highly scalable continuous replication of data for a distributed computer system. Embodiments of the present invention are optimized to function with highly scalable distributed computer systems having hundreds of nodes, or more (e.g., cloud computing system, etc.). In a typical usage scenario, application data resides across a large number of data server nodes. Clients interact with the distributed computer system by directly writing data to one or more of the data server nodes with minimal interaction with other nodes or portions of the distributed computer system (e.g., little interaction with metadata servers, or the like). The data servers typically have multiple LUNs (logical unit numbers) which each have their own reserved storage space. A typical implementation would have the LUNs configured with up to $2^{64}$ partitions. The files of the distributed computer system are composed of objects (e.g., data objects, etc.) which can be from any of the data server nodes, any of the LUNs and/or any of the partitions. Embodiments of the present invention implement a continuous replication process for groups of objects from the various data server nodes. The continuous replication process can be any of a number of different RAID processes. A typical continuous replication process is now described in the discussions of FIG. 1 below.

FIG. 1 is a block diagram depicting a network architecture 100 in which client systems 110, 120 and 130, as well as storage servers 140A and 140B (e.g., it will and any of which can be implemented using computer system 200), are coupled to a network 150 in accordance with one embodiment of the present invention. A storage server 140A is further depicted as having storage devices 160A(1)-(N) directly attached, and storage server 140B is depicted with storage devices 160B(1)-(N) directly attached. Storage servers 140A and 140B are also connected to a SAN fabric 170, although connection to a storage area network is not required for operation of the disclosure. SAN fabric 170 supports access to storage devices 180(1)-(N) by storage servers 140A and 140B, and so by client systems 110, 120 and 130 via network 150. SAN fabric 170 also supports access to a storage array 190, which is also shown as an example of a specific storage device. Certain functionality of embodiments of the present invention are implemented via a replication manager 195, which is shown as instantiated on the server 140B.

Client computer systems 110, 120 and 130 are communicatively coupled via the network 150. Client systems 110, 120 and 130 are able to access information on data server 140A or 140B using, for example, a web browser or other client software (not shown). Such a client allows client systems 110, 120 and 130 to access data hosted by storage server 140A or 140B or one of storage devices 160A(1)-(N), 160B(1)-(N), 180(1)-(N) or storage array 190. Additionally, FIG. 1 depicts the use of a network such as the Internet for exchanging data, but the present disclosure is not limited to the Internet or any particular network-based environment. It should be noted that although two data server nodes 140A and 140B are shown, embodiments of the present invention can function with highly scalable distributed computer systems having hundreds of nodes, or more (e.g., cloud computing system, etc.).

Figure 2:
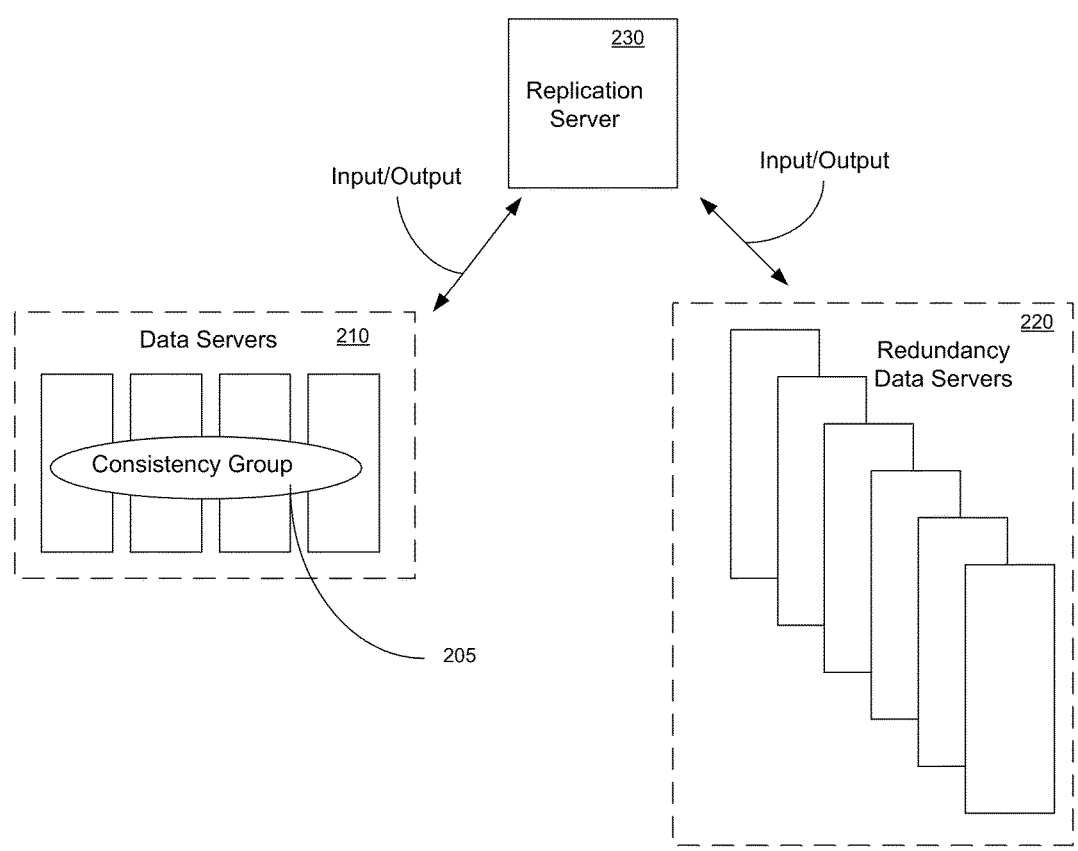
FIG. 2 shows a data flow diagram depicting the operation of an exemplary continuous replication process in accordance with one embodiment of the present invention.

FIG. 2 shows a data flow diagram 200 depicting the operation of an exemplary continuous replication process in accordance with one embodiment of the present invention. As depicted in FIG. 2, a group of data servers host data that is accessed by a large number of client computer systems (e.g., clients 110-130). As I/O data comes in from the client computer systems (e.g., I/O writes), the I/O data is forwarded to a replication server 230, which processes the I/O data and transfers it to a plurality of redundant data servers 220.

The FIG. 2 embodiment illustrates a scalable distributed computer system environment. In one embodiment, the distributed computer system environment implements any of a number of different RAID redundancy schemes by forwarding data from the replication server 230 to the plurality of redundancy data servers 220.

Referring still to FIG. 2, in one embodiment, when the objects comprising a file are created, they are marked with attributes which joins them in RAID groups. Through the normal course of operation, the client's I/O data, specifically their write data (e.g., the similar holds true for the metadata written by one or more metadata servers) is received and stored on the data servers 210. The data servers 210 store data objects that are specified as belonging to a particular RAID group.

It should be noted that write offset may also be important in deciding the object/partition location. The data servers 210 then forward these data objects to the replication server 230. The replication server 230 then forwards these data objects to the destination redundancy data servers according to the replication policy, such as, for example, the RAID policy. For example if the RAID policy for the file is RAID-1 then it just has to copy the data, whereas if the RAID policy is RAID-5 then it has to distribute the data, compute the parity, or even at times read the old data and merge the data before computing parity.

It should be noted that in one embodiment, from the replication server to the redundancy server (e.g., the destination node for replication), there are two ways of replication. One way involves synchronous replication, in which the source data server will be notified only after the destination redundancy server has acknowledged the data. A second way involves asynchronous replication, in which the replication server locally logs the data in order and sends an acknowledgement back to source data server, however the data is sent asynchronously to the remote redundancy server.

In one embodiment, the above described data server to replication server to redundancy data server protocol/algorithm also takes care of temporary and permanent data server failure by redirecting the I/O to some temporary objects, which are later used to re-mirror the original objects.

In this manner, embodiments of the present invention advantageously propagate replication consistency group information from the application level down to the object level. For example, the replication consistency group 205 can span several files, sub-directories and/or file systems, depending on how it is defined. In some distributed computer systems there may exist support for defining RAID policies at file and file system level. Embodiments of the present invention can implement the same for defining the replication policy. The replication policies set on the file system are inherited by the file when it is created. More sophisticated policies can be defined based on file extension, naming convention, directory level inheritance, and the like.

Figure 3:
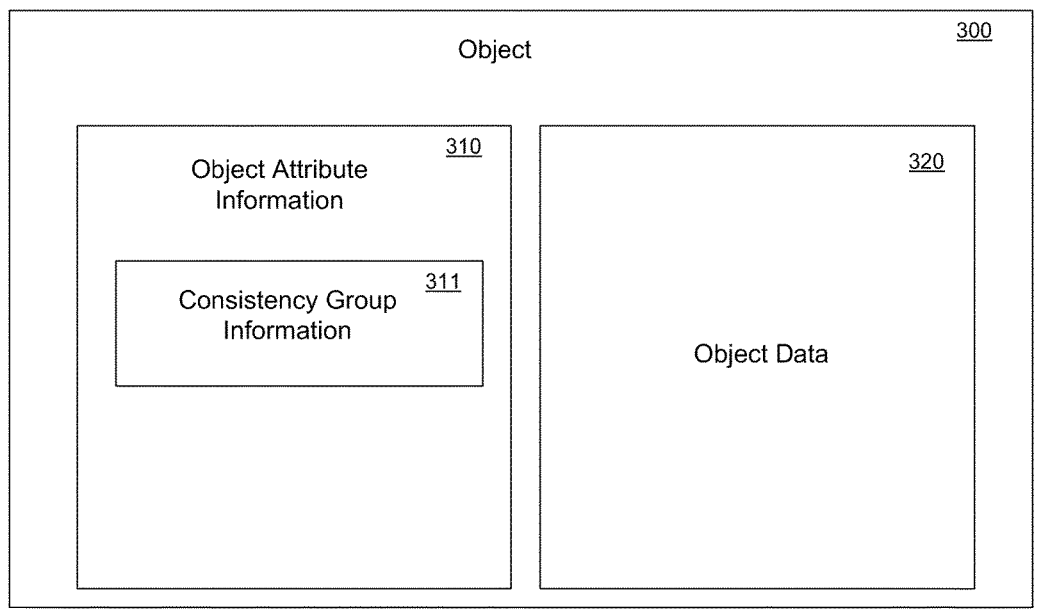
FIG. 3 shows a diagram depicting an exemplary data object in accordance with one embodiment of the present invention.

FIG. 3 shows a diagram depicting an exemplary data object 300 in accordance with one embodiment of the present invention. As depicted in FIG. 3, the data object 300 includes attribute information 310 along with object data 320. The attribute information further includes consistency group information 311.

In one embodiment, when the objects for a specific row in a file are created, attributes are set on each object which points to other objects in the RAID group. Similarly, for replication, a pointer is set to a pseudo object. The LUN ID of the pseudo object will decide the consistency groups in which that object falls. In one embodiment, the data server identified by this pseudo object will actually be the replication server. It should be noted that the replication server can be hosted on the data server physical machine or can have a separate physical machine, as depicted in FIG. 2. For example, depending upon the implementation, for every consistency group there could be a different replication server.

In one embodiment, when a data object write I/O hits a data server, and the data server sees the pseudo attribute, it mirrors the write data (along with offset and other attributes) to the replication server. The replication server then examines the object attribute information (e.g., object attribute information 310) in order to discover the consistency group, file ID, offset, file system ID and log the data/metadata for asynchronous replication. It should be noted that in one embodiment, metadata changes (e.g., namespace operations) can be tapped from a metadata server, or alternately can be extracted from a data server with the knowledge of how they file system maps the metadata to the objects on the data server.

Figure 4:
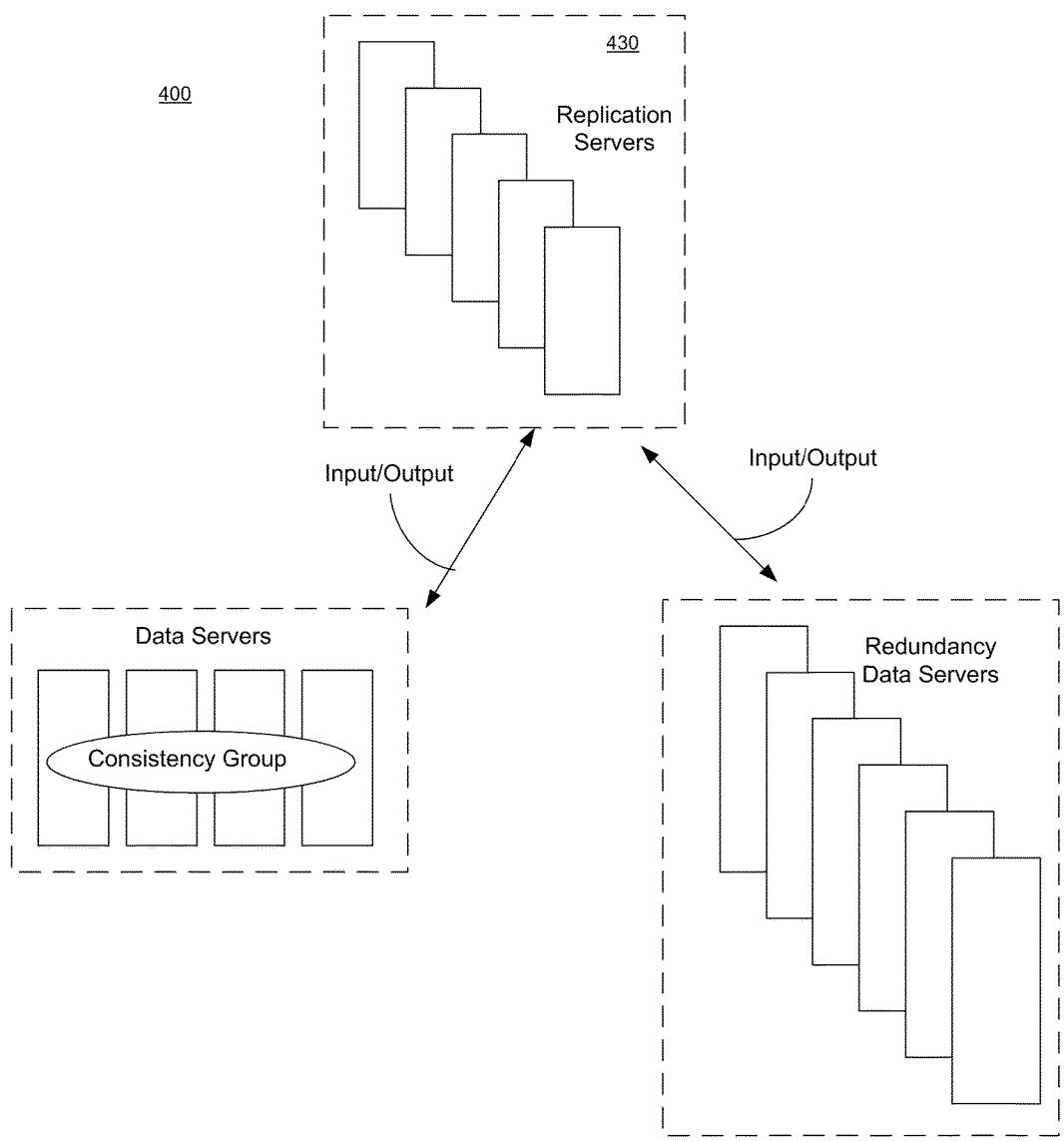
FIG. 4 shows a data flow diagram depicting the operation of an up scaled continuous replication process in accordance with one embodiment of the present invention.

FIG. 4 shows a data flow diagram 400 depicting the operation of an up scaled continuous replication process in accordance with one embodiment of the present invention. The up scaled continuous replication process depicted in FIG. 4 is essentially similar to process described above in the discussion of FIG. 2. However, the FIG. 4 embodiment uses a plurality of replication servers to implement the continuous replication functionality described above. Instead of a single physical machine, the continuous replication functionality is implemented by multiple replication servers 430. This attribute illustrates the manner in which the continuous replication functionality can scale to support clouds having hundreds or thousands of nodes.

Figure 5:
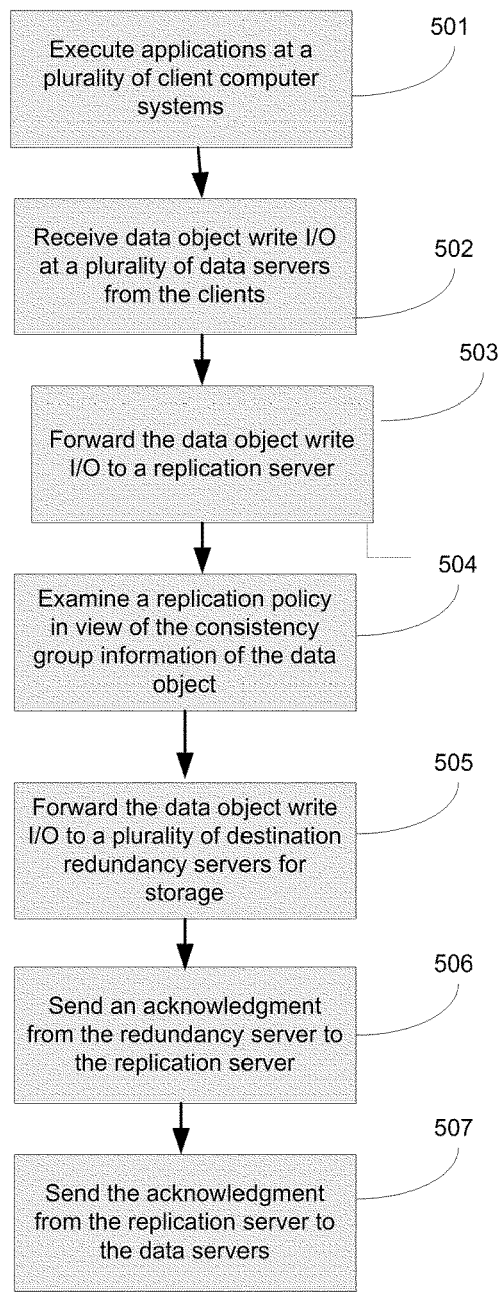
FIG. 5 shows a flowchart of the steps of a continuous replication process in accordance with one embodiment of the present invention.

FIG. 5 shows a flowchart of the steps of a continuous replication process 500 in accordance with one embodiment of the present invention. As depicted in FIG. 5, process 500 shows exemplary operating steps involved in implementing continuous replication for a distributed computer system.

Process 500 begins in step 501, where one or more applications execute a plurality of client computer systems. The client computer systems each access data objects stored on a plurality of data servers. In step 502, data object write I/Os are received at a plurality of data servers from the clients. As described above, the data servers can examine the attribute information of the data object write I/Os to discover that these data object write I/Os are to be forwarded to a replication server for replication. Subsequently, in step 503, the data object write I/Os are forwarded to the replication server.

In step 504, the replication server examines a replication policy in view of the consistency group information of the data object write I/O's. As described above, the replication server 230 then forwards these data objects to the redundancy data servers according to the RAID policy (e.g., or other replication policy). For example if the RAID policy for the file is RAID-1 then it just has to copy the data, whereas if the RAID policy is RAID-5 then it has to distribute the data, compute the parity, or even at times read the old data and merge the data before computing parity.

In step 505, the data object write I/Os are afforded to a plurality of destination redundancy servers for storage. In step 506, the redundancy servers send acknowledgments back to the replication server indicating successful storage of the data object write I/O's. And subsequently, in step 507, the replication server sends the acknowledgments to the data servers indicating the successful storage of the data object write I/Os. In this manner, embodiments of the present invention provide a solution that enables efficient and highly scalable continuous replication of data for a distributed computer system. Embodiments of the present invention are optimized to function with highly scalable distributed computer systems having hundreds of nodes, or more (e.g., cloud computing system, etc.).

Figure 6:
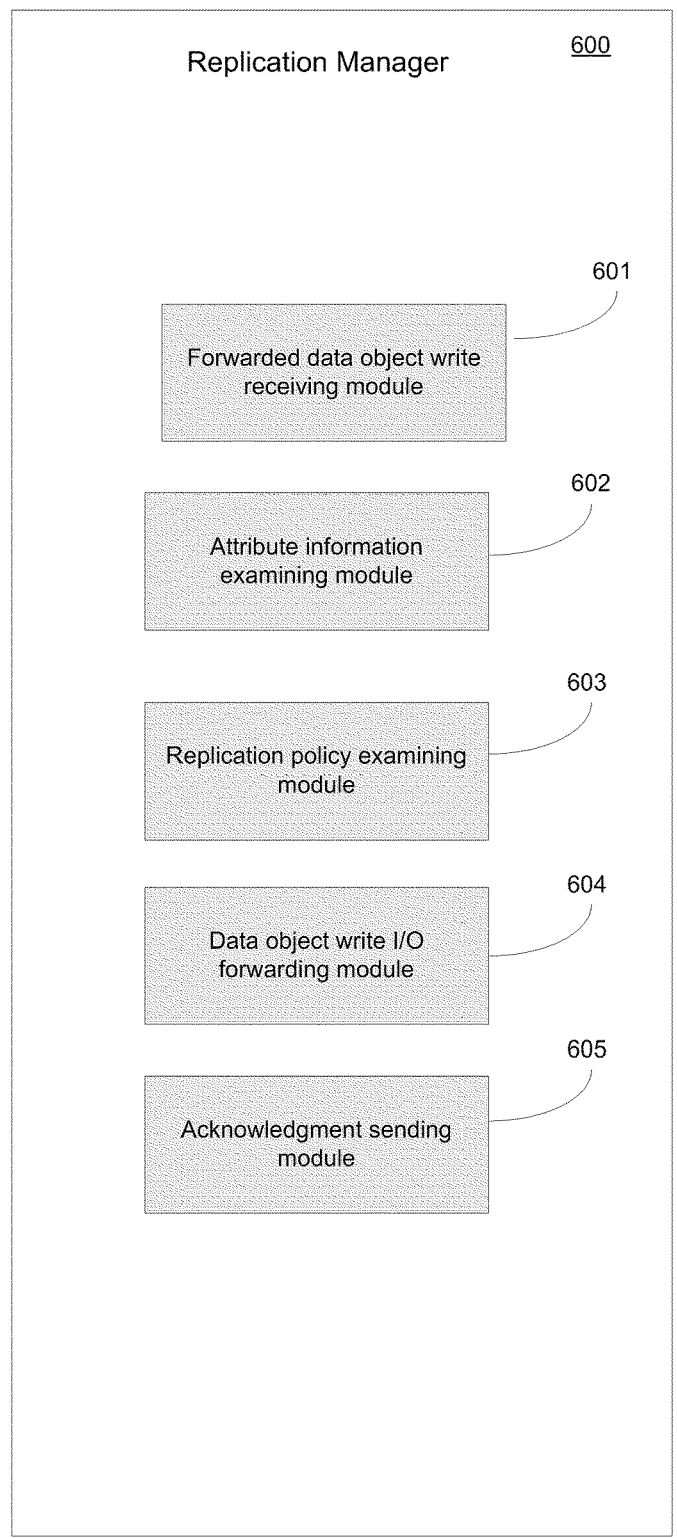
FIG. 6 shows a diagram of a repetition manager that implements certain aspects of the continuous replication functionality in accordance with one embodiment of the present invention.

FIG. 6 shows a diagram of a repetition manager 600 that implements certain aspects of the continuous replication functionality in accordance with one embodiment of the present invention. The replication manager 600 is a software component or module that when instantiated, implements the functionality of the continuous replication processes of embodiments of the present invention. The repetition manager 600 includes a forwarded data object write receiving module 601 which functions by receiving forwarded data object write I/O's from data servers. The attribute information examining modules 602 functions by examining attribute information of the data object to determine a consistency group for the data object, wherein the consistency group identifies selected data objects out of a plurality of data objects to undergo replication. The replication policy examining modules 603 functions by examining a replication policy in view of the consistency group of the data object to determine a destination redundancy server. The data object write I/O 40 module functions by forwarding the data object write I/O to the destination redundancy server for storage. The acknowledgment sending module functions by sending an acknowledgment to the data server upon storage of the data object in the destination redundancy server.

Figure 7:
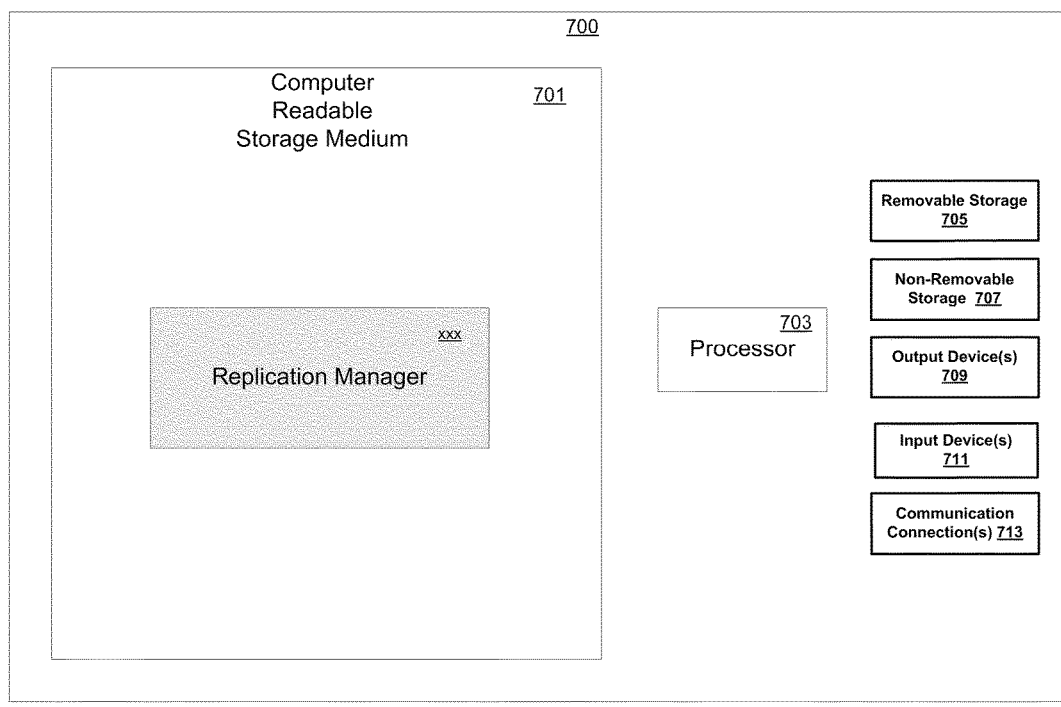
FIG. 7 shows a first exemplary computer system according to one embodiment.

FIG. 7 shows an exemplary computer system 700 according to one embodiment. Computer system 700 depicts the components of a basic computer system providing the execution environment for certain hardware-based and software-based functionality for the above described embodiments. For example, computer system 700 can be a system upon which the volume device manager 530 and one or more software stacks from FIG. 5 are instantiated. Computer system 700 can be implemented as, for example, a server computer system, workstation computer system, desktop computer system, or laptop computer system. Similarly, computer system 700 can be implemented as a handheld device. Computer system 700 typically includes at least some form of computer readable media (e.g., computer readable storage medium 701). Computer readable media can be a number of different types of available media that can be accessed by computer system 700 and can include, but is not limited to, computer storage media.

In its most basic configuration, computer system 700 typically includes processing unit 703 and a computer readable storage medium 701. Depending on the exact configuration and type of computer system 700 that is used, memory 701 can be volatile (e.g., such as DRAM, etc.), non-volatile (e.g., such as ROM, flash memory, etc.) or some combination of the two. Similarly, the memory 701 can comprise other devices besides solid-state devices, such as, for example, magnetic disk-based media, optical media, or the like.

Additionally, computer system 700 can include other mass storage systems (e.g., removable 705 and/or non-removable 707) such as magnetic or optical disks or tape. Similarly, computer system 700 can include input devices 711 and/or output devices 709 (e.g., such as a display). Computer system 700 can further include communication connections 713 to other devices, computers, networks, servers, etc. using either wired or wireless media. As all of these devices are well known in the art, they need not be discussed in detail.

It should further be noted, that the computer system 700 can have some, most, or all of its functionality supplanted by a distributed computer system having a large number of dispersed computing nodes, such as would be the case where the functionality of the computer system 700 is partly or wholly executed using a cloud computing environment.

Figure 8:
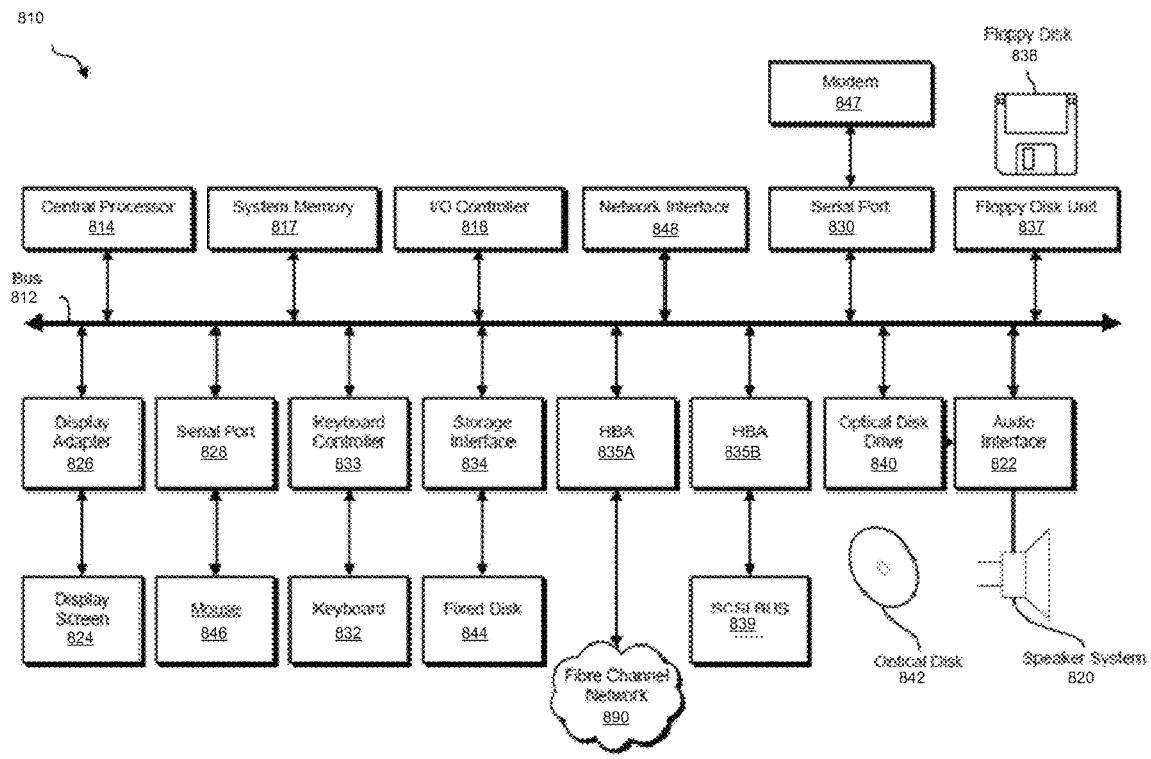
FIG. 8 depicts a block diagram of a second computer system suitable for implementing certain functionality in accordance with one embodiment of the present invention.

FIG. 8 depicts a block diagram of a computer system 810 suitable for implementing certain functionality in accordance with one embodiment of the present invention. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), a storage interface 834, a floppy disk drive 837 operative to receive a floppy disk 838, a host bus adapter (HBA) interface card 835A operative to connect with a Fiber Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812).

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. In the FIG. 8 embodiment, the system memory 817 instantiates a replication manager module 850 which implements the continuous replication functionality described above. The ROM or flash memory can contain, among other code, the Basic Input-Output system (BIOS) which controls basic hardware operation such as the interaction with peripheral components. Applications resident with computer system 810 are generally stored on and accessed via a computer readable medium, such as a hard disk drive (e.g., fixed disk 844), an optical drive (e.g., optical drive 840), a floppy disk unit 837, or other storage medium. Additionally, applications can be in the form of electronic signals modulated in accordance with the application and data communication technology when accessed via network modem 847 or interface 848.

Storage interface 834, as with the other storage interfaces of computer system 810, can connect to a standard computer readable medium for storage and/or retrieval of information, such as a fixed disk drive 844. Fixed disk drive 844 may be a part of computer system 810 or may be separate and accessed through other interface systems. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present disclosure. The devices and subsystems can be interconnected in different ways from that shown in FIG. 8. The operation of a computer system such as that shown in FIG. 8 is readily known in the art and is not discussed in detail in this application. Code to implement the present disclosure can be stored in computer-readable storage media such as one or more of system memory 817, fixed disk 844, optical disk 842, or floppy disk 838. The operating system provided on computer system 810 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing description, for the purpose of explanation, has been described with reference to specific embodiments. However, the illustrated discussions above are not intended to be exhaustive or to limit the invention to the precise forms disclosed. Many modifications and variations are possible in view of the above teachings. Embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method for implementing continuous data replication in a distributed computer system, the method comprising:
   receiving, at a replication server over a network, a forwarded data object I/O data operation from a remote data server, wherein the data object comprises attribute information and object data, and wherein the attribute information refers to other data objects in a consistency group, wherein the consistency group spans at least one of a plurality of file systems and a plurality of files;
   identifying, at the replication server, the attribute information of the data object, wherein the attribute information is inherited by the data object based on a replication policy on a file system of the remote data server;
   determining, at the replication server, consistency group information associated with the data object, wherein the consistency group information is determined based at least in part on the attribute information of the data object and specifies selected data objects among a plurality of data objects for data replication, wherein the consistency group information is associated with the data object based upon an identifier of a pseudo object, and wherein the pseudo object identifies a replication server that examines the attribute information of the data object to determine the consistency group information;
   determining, at the replication server, a remote destination redundancy server, from a plurality of remote destination redundancy servers, based at least in part on the replication policy and the consistency group information; and
   transmitting, from the replication server over the network, the data object to the determined remote destination redundancy server for storage;

wherein the replication policy is a RAID (redundant array of inexpensive discs) based replication policy and data objects comprising a data file are marked with attributes joining them in RAID groups and the determined redundancy server implements a RAID policy of the RAID group; and wherein when objects in a row of the data file are created, attributes are set on each object pointing to other objects in a RAID group and for replication a pointer is set to the pseudo object such that when the remote data server detects the pseudo object the remote data server mirrors the write data and attribute data to the replication server.

2. The method of claim 1, wherein the replication server is one of a plurality of replication servers with each replication server operating to implement the continuous replication.

3. The method of claim 1, wherein data write I/Os are received at the remote data server from a plurality of client computer systems, data objects comprising a data file are marked with attributes joining them in consistency groups, and the data object writes are forwarded to the replication server based on the attribute information.

4. A non-transitory computer-readable storage medium having stored thereon computer executable instructions that, if executed by a computer system, cause the computer system to perform a method for implementing continuous data replication in a distributed computer system, comprising:

receiving, at a replication server over a network, a forwarded data object I/O data operation from a remote data server of a group of remote data servers, wherein the data object comprises attribute information and object data, and wherein the attribute information refers to other data objects in a consistency group, wherein the consistency group spans at least one of a plurality of file systems and a plurality of files;

identifying, at the replication server, the attribute information of the data object, wherein the attribute information is inherited by the data object based on a replication policy on a file system of the remote data server;

determining, at the replication server, consistency group information associated with the data object, wherein the consistency group information is determined based at least in part on the attribute information of the data object and specifies selected data objects among a plurality of data objects for data replication, wherein the consistency group information is associated with the data object based upon an identifier of a pseudo object, and wherein the pseudo object identifies a replication server that examines the attribute information of the data object to determine the consistency group information;

determining, at the replication server, a remote destination redundancy server based at least in part on the replication policy and the consistency group information; and transmitting, from the replication server over the network, the data object to the determined remote destination redundancy server for storage;

wherein the replication policy is a RAID (redundant array of inexpensive discs) based replication policy and data objects comprising a data file are marked with attributes joining them in RAID groups and the determined redundancy server implements a RAID policy of the RAID group; and wherein when objects in a row of the data file are created, attributes are set on each object pointing to other objects in a RAID group and for replication a pointer is set to the pseudo object such that when the remote data server detects the pseudo object, the remote data server mirrors the write data and attribute data to the replication server.

5. The non-transitory computer-readable storage medium of claim 4, wherein the replication server is one of a plurality of replication servers with each replication server operating to implement the continuous replication.

6. The non-transitory computer-readable storage medium of claim 4, wherein data write I/Os are received at the plurality of remote data servers from a plurality of client computer systems, data objects comprising a data file are marked with attributes joining them in consistency groups, and the data object writes are forwarded to the replication server based on the attribute information.

7. A continuous replication system comprising:

a computer system having a processor coupled to a computer readable storage medium and executing computer readable code which causes the computer system to implement a replication manager module, wherein the replication manager module:

receives, at a replication server over a network, a forwarded data object I/O data operation from a remote data server of a group of remote data servers, wherein the data object comprises attribute information and object data, and wherein the attribute information refers to other data objects in a consistency group, wherein the consistency group spans at least one of a plurality of file systems and a plurality of files;

identifies, at the replication server, the attribute information of the data object, wherein the attribute information is inherited by the data object based on a replication policy on a file system of the remote data server, determines, at the replication server, consistency group information associated with the data object, wherein the consistency group information is determined based at least in part on the attribute information of the data object and specifies selected data objects among a plurality of data objects for data replication, wherein the consistency group information is associated with the data object based upon an identifier of a pseudo object, and wherein the pseudo object identifies a replication server that examines the attribute information of the data object to determine the consistency group information;

determines, at the replication server, a remote destination redundancy server, from a plurality of remote destination redundancy servers, based at least in part on the replication policy and the consistency group information; and transmits, from the replication server over the network, the data object to the determined remote destination redundancy server for storage;

wherein the replication policy is a RAID (redundant array of inexpensive discs) based replication policy and data objects comprising a data file are marked with attributes joining them in RAID groups and the determined redundancy server implements a RAID policy of the RAID group; and wherein when objects in a row of the data file are created, attributes are set on each object pointing to other objects in a RAID group and for replication a pointer is set to the pseudo object such that when the remote data server detects the pseudo object the remote data server mirrors the write data and attribute data to the replication server.

8. The system of claim 7, wherein the consistency group spans a plurality of files.

9. The system of claim 7, wherein the consistency group spans a plurality of file systems.

10. The system of claim 7, wherein the consistency group spans a plurality of file systems across a plurality of data servers.

11. The system of claim 7, wherein data objects specified by a consistency group are asynchronously replicated in accordance with the replication policy to implement continuous data replication for the consistency group.

12. The system of claim 7, wherein a plurality of replication servers are used to instantiate the functionality of the replication manager module to scale the continuous replication to support a cloud based computer system having at least hundreds of nodes.

13. The system of claim 7, wherein the replication manager module implements continuous data replication for a cloud based computer system.

* * * * *